(12) United States Patent
Creech et al.

(10) Patent No.: US 10,495,158 B1
(45) Date of Patent: Dec. 3, 2019

(54) METHOD AND SYSTEM FOR LATCHING AN ACTUATOR

(71) Applicant: Dana Automotive Systems Group, LLC, Maumee, OH (US)

(72) Inventors: Michael Z. Creech, Ann Arbor, MI (US); Douglas D. Turner, Holland, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 16/545,828

(22) Filed: Aug. 20, 2019

Related U.S. Application Data

(62) Division of application No. 15/325,657, filed as application No. PCT/US2015/040195 on Jul. 13, 2015.

(60) Provisional application No. 62/023,944, filed on Jul. 13, 2014.

(51) Int. Cl.
  *F16D 11/14* (2006.01)
  *F16D 27/14* (2006.01)
(52) U.S. Cl.
  CPC .................................. *F16D 27/14* (2013.01)

(58) Field of Classification Search
  CPC ........ F16D 27/118; F16D 27/14; F16D 11/14; F16D 2200/0026; F16D 2200/0082; F16D 2121/20; F16D 2200/0021; F16D 17/02
  See application file for complete search history.

(56) References Cited

U.S. PATENT DOCUMENTS

| | | | |
|---|---|---|---|
| 9,989,140 B2* | 6/2018 | Onitake | ................... F16D 27/09 |
| 2010/0179736 A1* | 7/2010 | Johnson | ................... F16H 48/30 |
| | | | 701/51 |
| 2018/0156348 A1* | 6/2018 | Hofmann | ............ F16K 31/0675 |

* cited by examiner

*Primary Examiner* — David J Hlavka
(74) *Attorney, Agent, or Firm* — Marshall & Melhorn, LLC

(57) ABSTRACT

A method and system for latching a solenoid. The method includes providing an axle disconnect system having an actuator with an electromagnetic coil, a housing, an armature, and a rotatable and axially slidable slide ring. The electromagnetic coil may then energized creating a magnetic flux through a magnetic circuit thereby causing the armature to move from a first to a second axial position where the magnetic flux through the magnetic circuit is uninterrupted. Once the electromagnetic coil has been energized, it is de-energized thereby allowing an amount of residual magnetism within the housing and/or the armature to maintain the armature in the second axial position. The armature is maintained in the second axial position by the magnetic flux of the magnetic circuit being uninterrupted.

6 Claims, 3 Drawing Sheets ial patent application claiming the benefit of U.S. Non-Provisional patent application Ser. No. 15/325,657 filed on Jan. 11, 2017, International (PCT) Patent Application NO. PCT/US2015/040195 filed on Jul. 13, 2015 and published as WO 2016/010918 A1, and U.S. Provisional Patent Application No. 62/023,944 filed on Jul. 13, 2014, which are incorporated herein by reference in their entirety.

METHOD AND SYSTEM FOR LATCHING AN ACTUATOR

CROSS-REFERENCE TO RELATED APPLICATIONS

The present application is a divisional patent application claiming the benefit of U.S. Non-Provisional patent application Ser. No. 15/325,657 filed on Jan. 11, 2017, International (PCT) Patent Application NO. PCT/US2015/040195 filed on Jul. 13, 2015 and published as WO 2016/010918 A1, and U.S. Provisional Patent Application No. 62/023,944 filed on Jul. 13, 2014, which are incorporated herein by reference in their entirety.

FIELD OF THE DISCLOSURE

The present invention relates to methods and systems for latching an actuator where the actuator has no, or minimal, magnetic gap. In certain embodiments, the invention relates to actuators for use in power take-off units or vehicular drivetrain systems, such as differentials, axle disconnect systems, or power transfer units. In a specific embodiment, the invention relates to an actuator for use in an axle disconnect system.

BACKGROUND OF THE INVENTION

In the automotive industry, actuators are used for a number of purposes, including in drivetrain systems such as differentials, axle disconnect systems, or power transfer units. As just one example, typical all-wheel drive systems for vehicles push torque through a torque coupling to the secondary axle to provide enhancements in performance, handling and mobility. These systems require that the secondary axle, and the rest of the driveline, be continually rotating at road speed, which reduces the overall efficiency of the vehicle, and reduces fuel economy.

Secondary axle disconnects are available and they permit the secondary axle and prop shaft to stop rotating. These disconnect systems increase vehicle efficiency, but the current systems also require power to both engage and disengage the output and/or remain engaged or disengaged. The latter situation may require constant power to the system, which reduces overall system efficiency, or may require the use of permanent magnets.

As is known in the art, the actuator converts electrical current into mechanical force. The flow of electrical current into the actuator creates a magnetic field that moves a metal armature which, via additional mechanical elements, results in a change in the engagement/disengagement status of the particular drivetrain system, such as the axle disconnect system described briefly above.

Traditionally, when the actuator was energized, the armature would be drawn towards the solenoid as a result of the magnetic field generated, engaging the axle disconnect system. If it was desirable to keep the system engaged, either current would have to be continually applied or permanent magnets would have to be included in the design of the actuator so that the armature would stay in the engaged position. For obvious reasons, it is not desirable to have a solenoid draw significant power when holding the system engaged (or disengaged).

Latching solenoids may also accomplish maintained engagement with a permanent magnet in the system. The use of permanent magnets has undesirable consequences such as temperature demagnetization and shock demagnetization. In addition, depending on the material, permanent magnets can be costly, difficult to fasten, and can be fragile.

It would be desirable for a system to maintain vehicle efficiency by using an actuator that did not require continuous power or permanent magnets to stay engaged.

The current disclosure utilizes certain design features, certain low cost magnetic steels, and a connect/disconnect strategy that will control current to the actuator. It does not use any separate permanent magnet component(s), thus achieving the same desired result with no design sacrifices or additional cost.

SUMMARY OF THE DISCLOSURE

The present disclosure includes the use of an actuator in an engaged position that is made up of the following: a unenergized coil of copper windings disposed in an overmold, a housing at least partially surrounding the coil, an armature in sliding engagement with the housing, and wherein magnetic flux is uninterrupted between the armature and at least one of the coil or housing.

The disclosure herein also describes an axle disconnect system that when engaged, includes the following: an actuator with an unenergized coil of copper windings disposed in an overmold, a housing at least partially surrounding the coil, and an armature in sliding engagement with the housing, wherein magnetic flux is uninterrupted between the armature and at least one of the coil or housing. The axle disconnect system may also include a rotatable and axially slidable slide ring located between at least one of (i) the coil housing or armature and (ii) a sliding collar, the slide ring with a radially outer surface, a radially inner surface, a first end and a second end. The sliding collar has a first portion and a second portion. The first portion is located directly radially inward from the slide ring and defines a first portion defining a first set of axially extending teeth. The second portion located radially inward from the first portion; a return spring groove located radially inward from the sliding collar first portion and housing a return spring therein; and an output gear with a second set of axially extending teeth for engagement with the sliding collar first set of teeth.

A method and system for latching a solenoid. The method includes providing an axle disconnect system having an actuator with an electromagnetic coil, a housing, an armature, and a rotatable and axially slidable slide ring. At least a portion of the housing may surround at least a portion of the electromagnetic coil having copper windings disposed within an overmold. Additionally, at least a portion of the armature may be in sliding engagement with at least a portion of the housing of the axle disconnect system. Furthermore, at least a portion of the rotatable and axially slidable slide ring may be located between at least one of the housing or the armature and a sliding collar. The sliding collar may include a first portion located directly radially inward from the slide ring and defining a first set of axially extending teeth. The sliding collar may further includes a second portion that is located radially inward from the first portion and may have a first set of splines. The electromagnetic coil may then energized creating a magnetic flux through a magnetic circuit thereby causing the armature to move from a first to a second axial position where the magnetic flux through the magnetic circuit is uninterrupted. Once the electromagnetic coil has been energized, it may be de-energized thereby allowing an amount of residual magnetism within the housing and/or the armature to maintain the armature in the second axial position. The armature may be maintained in the second axial position by the magnetic flux of the magnetic circuit being uninterrupted.

According to an aspect of the disclosure, the method may further include the step of sending a re-energizing current pulse to the electromagnetic coil in order to ensure that engagement is maintained.

According to any one of the previous aspects of the disclosure, the method may further include the step of sending a reverse current pulse to the electromagnetic coil to end engagement.

A method and system for latching a solenoid. The method includes providing a power take-off unit having an actuator with an electromagnetic coil, a housing, an armature, and a rotatable and axially slidable slide ring. At least a portion of the housing may surround at least a portion of the electromagnetic coil having copper windings disposed within an overmold. Additionally, at least a portion of the armature may be in sliding engagement with at least a portion of the housing of the power take-off unit. Furthermore, at least a portion of the rotatable and axially slidable slide ring may be located between at least one of the housing or the armature and a sliding collar. The sliding collar may include a first portion located directly radially inward from the slide ring and defining a first set of axially extending teeth. The sliding collar may further includes a second portion that is located radially inward from the first portion and may have a first set of splines. The electromagnetic coil may then energized creating a magnetic flux through a magnetic circuit thereby causing the armature to move from a first to a second axial position where the magnetic flux through the magnetic circuit is uninterrupted. Once the electromagnetic coil has been energized, it may be de-energized thereby allowing an amount of residual magnetism within the housing and/or the armature to maintain the armature in the second axial position. The armature may be maintained in the second axial position by the magnetic flux of the magnetic circuit being uninterrupted.

According to an aspect of the disclosure, the method may further include the step of sending a re-energizing current pulse to the electromagnetic coil in order to ensure that engagement is maintained.

According to any one of the previous aspects of the disclosure, the method may further include the step of sending a reverse current pulse to the electromagnetic coil to end engagement.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE DISCLOSURE

Figure 1:
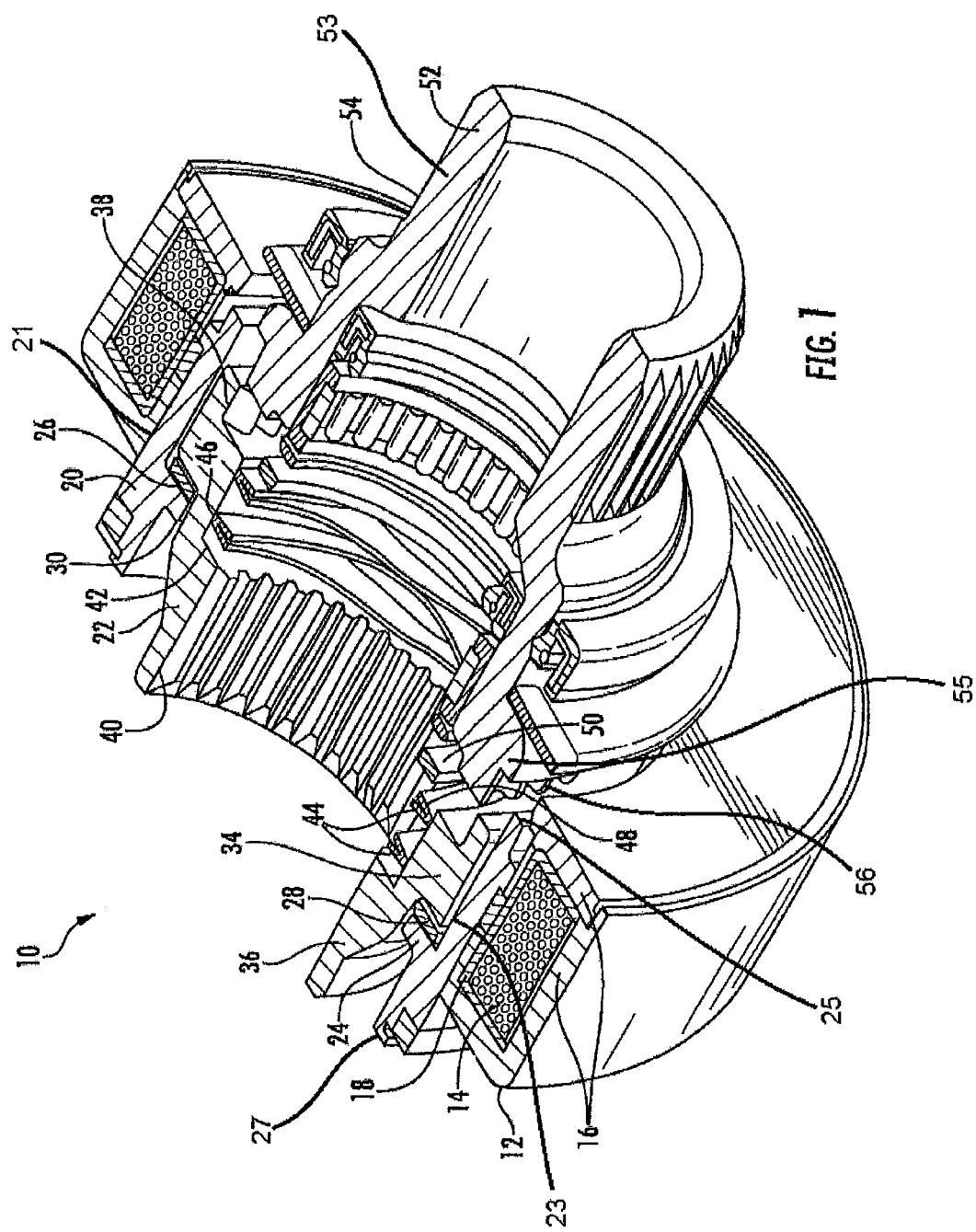
FIG. 1 is a partial cut-away perspective view a typical axle disconnect system using an embodiment of an actuator in accordance with the disclosure where the actuator is in an unengaged position.

It is to be understood that the invention may assume various alternative orientations and step sequences, except where expressly specified to the contrary. It is also to be understood that the specific assemblies, articles and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments may be commonly referred to with like reference numerals within this section of the application.

For use in this description only, the terms actuator and solenoid may be used interchangeably.

Turning now to FIG. 1, one example of an axle disconnect system 10 for use with the embodiments of the invention is shown. The system 10 comprises an electromagnet 12 including a coil 14 and a coil housing 16. The coil housing 16 is hollow and encloses the coil 14. The coil 14 comprises multiple copper wire windings encased in a potting material 18 within the coil housing 16. As a non-limiting example, the material 18 is a potting material, an overmold and/or any other material that will protect the copper windings of the coil 14 from shocks, vibrations, moisture, dust, extreme temperatures, corrosive agents and/or electrically shorting out to improve the overall life and durability of the copper windings. The wire windings of the coil 14 are connected to a source for electricity (not shown).

The coil housing 16 may be one piece or several pieces that have been connected together.

A slide ring 20 having a radially outer surface 21, a radially inner surface 23, a first end 25 and a second end 27 is located between the coil housing 16 and a sliding collar 22. More particularly, the slide ring 20 is located radially inward from the coil housing 16 and is in direct contact therewith. The slide ring 20 is constructed of a metallic material that is susceptible to magnetic forces, such as steel.

The slide ring 20 may have a complementary shape to the coil housing 16.

An arm 24 extends radially inward from the slide ring 20. A first side 26 of the inwardly extending arm 24 is located axially adjacent a first bushing 28. A second side 30 of the inwardly extending arm 24 is adjacent the sliding collar 22. The slide ring 20 is adapted for selective axial movement.

The first bushing 28 is located between the slide ring 20 and the sliding collar 22. The first bushing 28 is a continuous, ring-shaped structure. The first bushing 28 is constructed of a non-magnetic material, such as, but not limited to, plastic.

The sliding collar 22 is located directly radially inward from the slide ring 20 and directly radially outward from an output shaft (not shown), and has a first portion 34 and a second portion 36. The first and second portions 34, 36 are unitary and one-piece with one another. More particularly, the first portion 34 is located directly radially inward from the slide ring 20 and extends radially outward parallel to the radially inwardly extending arm 24 of the slide ring 20. The first portion 34 of the sliding collar 22 has a first set of axially extending teeth 38.

The second portion 36 is located radially inward from the first portion 34, and extends in an outward direction parallel with the output shaft (not shown). The second portion 36 defines a first set of axially extending splines 40. The splines 40 are integrally formed and unitary with the sliding collar 20 and allow for axial movement along the output shaft (not shown).

A return spring groove 42 as also depicted in FIG. 1, is located radially inward from the first portion 34 of the sliding collar 22. The return spring groove 42 receives a return spring 44 therein. A first end 46 of the return spring 44 abuts an end of the return spring groove 42. A second end 48 of the return spring 44 abuts a snap ring 50.

An output gear 52 having a first end portion 53 and a second end portion 55 is located radially inward from the slide ring 20 and radially outward from the output shaft (not shown). An outer surface 54 of the second end portion 55 of the output gear 52 defines a second set of axially extending teeth 56 for engaging the first set of axially extending teeth 38 on the sliding collar 22. The engagement of the teeth sets 38, 56 rotationally locks the sliding collar 22 with the output gear 52.

The system has two modes of operation. In a first mode of operation as depicted in FIG. 1, the sliding collar 22 and the output gear 52 are not connected or rotating together, but sometimes it is desired that they be connected so that they rotate together. When this mode is to be used, electricity is sent to the coil 14 and the coiled wires create a magnetic flux. In other words, the current in the coil 14 causes the coil housing 16 to become magnetized. The sum of the coil flux and the housing magnetism is greater than the sum of the spring force of the return spring 44 and friction force of the slide ring 20, which causes the slide ring 20 to move. Within a few milliseconds of the coil 14 being energized, the magnetic flux contributes to the magnetic slide ring 20 moving in the axial direction. The slide ring 20 axially moves the first bushing 28, which in turn axially moves the sliding collar 22 pushing the sliding collar 22 into engagement with the output gear 52.

As the first mode is being engaged, the first set of teeth 38 on the sliding collar 22 are not engaged with the second set of teeth 56 on the output gear 52; a gap separates the two sets of teeth 38, 56. However, as the sliding collar 22 is moved, the gap separating the two sets of teeth 38, 56 closes. In a short amount of time, on the order of milliseconds, the gap is closed and the first set of teeth 38 on the sliding collar 22 engage with the second set of teeth 56 on the output gear 52. Upon engagement of the two sets of teeth 38, 56, the sliding collar 22 is rotationally fixed to the output gear 52. The rotation from the sliding collar 22 is transferred through the output gear 52 to the output shaft (not shown).

In prior art systems, when it is desired that the components no longer be engaged, the electricity to the coil 14 is interrupted. The return spring 44 pushes against the sliding collar 22 thus urging it axially away from the output gear 52. The biasing of the return spring 44 separates the two sets of teeth 38, 56. The return spring 44 permits the system 10 to default to a position where the components are not engaged. When the sliding collar 22 is not engaged with the output gear 52, the system 10 is in the mode as depicted in FIG. 1.

The current disclosure, however, utilizes an actuator designed with a continuous magnetic circuit (no/minimal air gaps), such that, when energized, the surfaces mate and provide sufficient contact to allow any residual magnetism in the components to have a continuous path.

The permanent flux from the coil housing 16 is strong enough to hold the sliding collar teeth 38 in engagement with the output gear teeth 56. Therefore, if power is turned off to the coil 14, the system 10 will stay in the engaged position. Therefore, the system does not require power to stay in the engaged position. This is advantageous since it can operate in the engaged position without continuing to draw electrical power, which makes the system more efficient.

When it is desired that the system 10 no longer be engaged, a current is provided to the coil 14 to create a flux in the opposite direction. The flux would demagnetize the coil housing 16. The spring 44 pushes against the sliding collar 22 thus urging it axially away from the output gear 52. The biasing of the spring 44 separates the two sets of teeth 38, 56. When the sliding collar 22 is not engaged with the output gear 52 the system is in the second mode.

Figure 2:
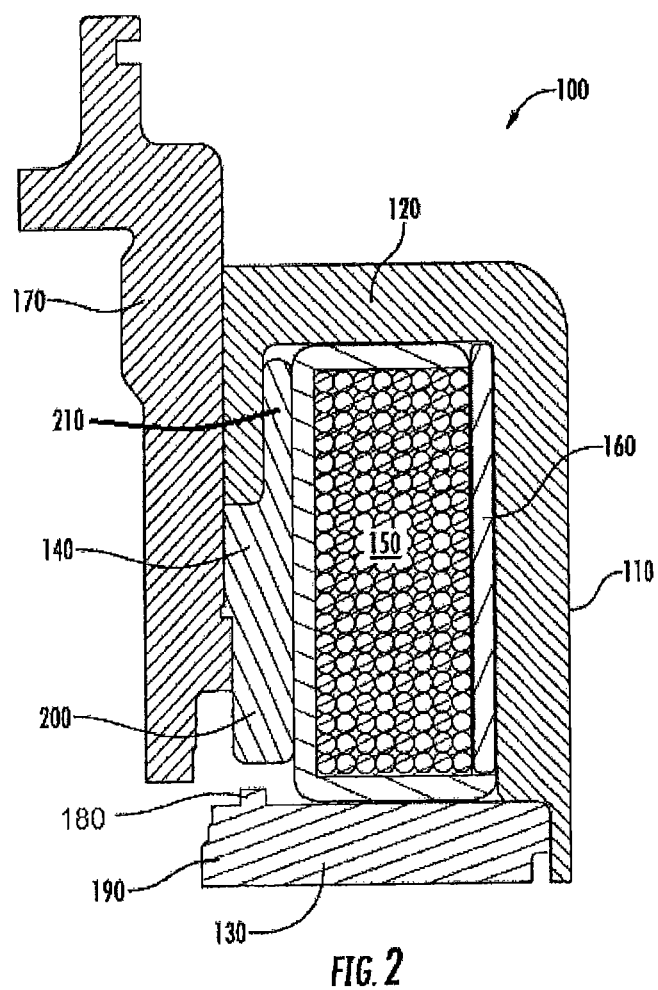
FIG. 2 shows a schematic cross sectional view of a second embodiment of an actuator in accordance with the disclosure where the actuator is in an unengaged position.

FIG. 2 shows a cross-sectional view of an unengaged actuator 100 in accordance with one embodiment of the disclosure. The actuator 100 includes an electromagnetic coil 110. The electromagnetic coil 110 is composed of a coil housing 120, a cover 130, an armature 140, and copper wire windings 150 encased in a material 160. As a non-limiting example, the material 160 is a potting material, an overmold and/or any other material that will protect the copper windings 150 of the electromagnetic coil 110 from shocks, vibrations, moisture, dust, extreme temperatures, corrosive agents and/or electrically shorting out to improve the overall life and durability of the copper windings. The cover 130 may have, but is not necessary, a nub 180. The nub 180 extends axially from the inner radial end 190 of the cover 130. The armature 140 has a first end 200 that, in an unengaged position, is separated from the nub 180. The armature has a second end 210 of a shape complementary to that of the housing 120 and can about the housing 120 when in the unengaged position.

As illustrated in FIG. 2 of the disclosure and as a non-limiting example, a slide ring 170 that abuts and is complementary to the armature 140.

The cover 130, coil housing 120, and armature 140 will all be made of a ferrous metal that has residual magnetism. Such metals may be a high carbon steel, such as, but no limited to a 1095 carbon steel, a 1065 carbon steel or any other carbon steel with a carbon content of approximately 0.5% or more.

Upon activation, power is supplied to the copper windings 150, which, within a few milliseconds, creates a magnetic flux in at least one of the coil housing 120, the cover 130 and the armature 140. The coil housing 120, the cover 130 (if present) and the armature 140 create a magnetic circuit through which the magnetic flux can travel. The magnetic flux acts on the ferrous material of the armature 140, causing it to move. After activation, the first end 200 of the armature 140 comes into contact with the nub 180 of the cover 130. The second end 210 of the armature 140 has less contact with the coil housing 120. The movement of the armature 140 causes the slide ring 170 to move, thereby engaging the rest of the system.

Figure 4:
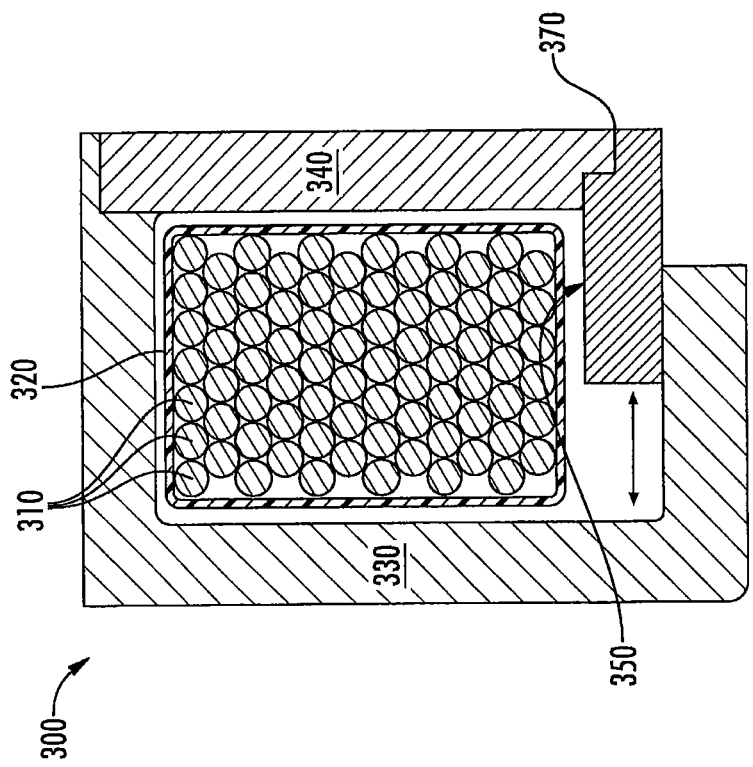
FIG. 4 shows a schematic cross sectional view of an engaged actuator in accordance with embodiments of the disclosure.
Figure 3:
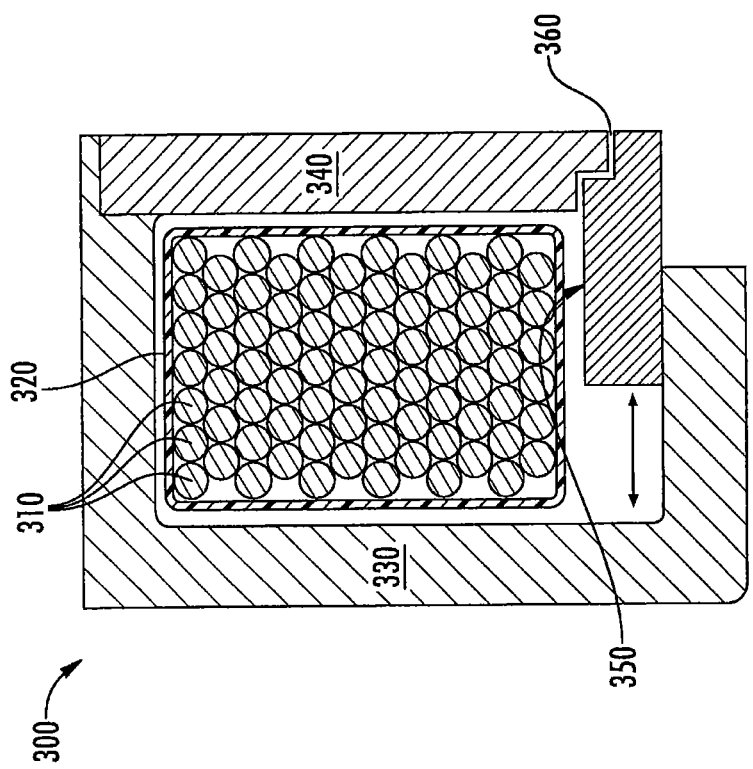
FIG. 3 shows a schematic cross sectional view of an engaged actuator as known in the prior art.

Although this actuator 100 is shown, various embodiments are contemplated to be within the scope of the invention, including actuators with differently shaped covers, armatures and housings. The way the armature and housing interact can vary, as can how the armature and cover interact upon engagement. The actuator 100 shown is just one of many possibilities. One important aspect of the invention is that the actuator be able to stay engaged, or latch, even when continuous power is not being supplied to the coil. In order to accomplish this without the use of a permanent magnet, there must be no or minimal magnetic gap between the armature and the rest of the electromagnetic coil. FIGS. 3 and 4 are illustrative.

FIG. 3 shows engagement a very generic electromagnetic coil 300 as would be seen in the prior art. The electromagnetic coil 300 consists of copper windings 310 in a potting or overmold 320. The copper windings 310 and overmold 320 are contained in a housing 330 with a cover 340. The armature 350 may selectively move in the axial direction (indicated by the arrow). In this figure, the electromagnetic coil 300 is engaged. In typical prior art systems, a magnetic gap 360 remains between the armature 350 and the cover 340 even during activation of the coil 300.

Conversely, the actuators of the invention, as shown generically in FIG. 4 have no magnetic gap and generally the armature 350 will contact the housing 330 or cover 340 (depending on precise design of actuator) through contact point 370. Precise and complete contact through contact point 370 is not necessary. A minimal gap or partial gap may be permissible as long as the magnetic flux traveling through magnetic circuit of the coil housing 330, cover 340, and/or armature 350 is uninterrupted and strong enough to keep the electromagnetic coil 300 latched. It is important to note that, if the system in which the electromagnetic coil 300 is used has other forces working on the armature, such as, but not limited to, the pull of a return spring (as depicted in more detail in the first embodiment), the residual magnetism in the magnetic circuit of the electromagnetic coil 300 will have to be strong enough to overcome those opposing forces.

Details of the interface between the armature 350 and rest of the electromagnetic coil 300 may be manipulated to affect the holding force (e.g. parallel butt-face or chamfered interface provide different holding force).

Residual magnetism varies within the common steels available. In most cases, materials are chosen to reduce/eliminate this nuisance property. By properly selecting the grade of steel, the holding force may be defined for a given solenoid design. One non-limiting example may be high carbon steels such as, but not limited, a 1095 carbon steel, a 1065 carbon steel or any other carbon steel with a carbon content of approximately 0.5% or more. Other materials used, such as a ferrous material for the armature 350, will be those known in the art.

As residual magnetic flux may decay over time, the control solution may include periodic energy pulses to reinforce coupling strength.

With respect to releasing the coupling, once powered and the closed magnet circuit is in place, a pulse of current through the coil in the reverse direction counter-acts the flux that holds the armature and solenoid together. This pulse should be of sufficient duration to generate enough flux to counteract the flux from the retained magnetism and short enough not to cause re-engagement.

In certain applications, where vibration is high or design constraints exist that cause loss of holding force over time, it may be necessary to send an energizing pulse every so often to ensure the device maintains holding.

The control system for such a residual magnetism coupling system may be further enhanced based on other information available within the overall vehicle architecture. For example, if the vehicle dynamic control system detects a change in acceleration (e.g. yaw, pitch, roll) the control system for the coupling solution may leverage this data in an algorithm which would determine when the controller would generate a reinforcement pulse to ensure the coupling is maintained during the vehicle dynamic event.

As noted previously, the axle disconnect system described above is just one example of many systems in which the current invention may be used. Variations in axle disconnect systems might include different shapes of coil housing 16, or the addition or subtraction of other elements in the system.

Also, it may be appreciated that one embodiment of the system described and depicted herein is for an axle connect/disconnect system. However, the device described herein is not limited to just axles. Instead, the device may be applied to other devices, equipment and methods known in the automotive arts including, but not limited to, power take off units, differentials, and power transfer units. Several examples of systems that may be used with actuators of the invention may be found in U.S. patent application Ser. No. 14/606,066 which discusses several axle disconnect and power take-off unit systems, all of which could be used with actuators that take advantage of residual magnetism as described herein.

In accordance with the provisions of the patent statutes, the present invention has been described in what is considered to represent its preferred embodiments. However, it should be noted that the invention may be practiced otherwise than as specifically illustrated and described without departing from its spirit or scope.

What is claimed is:

1. A method of maintaining engagement of an axle disconnect system, the method comprising the steps of,
   (i) providing an axle disconnect system comprising an actuator, wherein said actuator comprises:
       an electromagnetic coil comprising copper windings disposed in an overmold;
       a housing at least partially surrounding said electromagnetic coil;
       an armature in sliding engagement with said housing;
       a rotatable and axially slidable slide ring located between at least one of said housing or armature and a sliding collar, said sliding collar comprising a first portion and a second portion, said first portion is located directly radially inward from said slide ring, said first portion defining a first set of axially extending teeth, said second portion is located radially inward from said first portion, said second portion of said sliding collar has a first set of splines;
   (ii) energizing the electromagnetic coil, thereby causing a magnetic flux through a magnetic circuit, and thereby causing said armature to move from a first axial position to a second axial position where said magnetic flux through said magnetic circuit is uninterrupted;
   (iii) de-energizing said electromagnetic coil;
   (iv) using residual magnetism of said housing and/or said armature to maintain the armature in said second axial position where said magnetic flux through said magnetic circuit is uninterrupted; and
   (v) maintaining said armature in said second axial position where said magnetic flux through said magnetic circuit is uninterrupted.

2. The method of maintaining engagement of the axle disconnect system of claim 1, wherein the method further comprises the step of sending a re-energizing current pulse to said electromagnetic coil to ensure engagement is maintained.

3. The method of maintaining engagement of the axle disconnect system of claim 1, wherein said method further comprises the step of sending a reverse current pulse to said electromagnetic coil to end engagement.

4. A method of maintaining engagement of a power take-off unit, the method comprising the steps of,
   (i) providing a power take-off unit comprising an actuator, wherein said actuator comprises:
       an electromagnetic coil comprising copper windings disposed in an overmold;
       a housing at least partially surrounding said electromagnetic coil;
       an armature in sliding engagement with said housing;
       a rotatable and axially slidable slide ring located between at least one of said housing or armature and a sliding collar, said sliding collar comprising a first portion and a second portion, said first portion is located directly radially inward from said slide ring, said first portion defining a first set of axially extending teeth, said second portion is located radially inward from said first portion, said second portion of said sliding collar has a first set of splines;
(ii) energizing said electromagnetic coil, thereby causing a magnetic flux through a magnetic circuit and thereby causing said armature to move from a first axial position to a second axial position where said magnetic flux through said magnetic circuit is uninterrupted,
(iii) de-energizing said electromagnetic coil;
(iv) using residual magnetism of said housing and/or said armature to maintain said armature in said second axial position where said magnetic flux through said magnetic circuit is uninterrupted; and
(v) maintaining said armature in said second axial position where said magnetic flux through said magnetic circuit is uninterrupted.

5. The method of claim 4, wherein the method further comprises the step of sending a re-energizing current pulse to said electromagnetic coil to ensure engagement is maintained.

6. The method of claim 4, wherein the method further comprises the step of sending a reverse current pulse to said electromagnetic coil to end engagement.

* * * * *